United States Patent [19]

Wang et al.

[11] 4,052,680

[45] Oct. 4, 1977

[54] METAL VAPOR LASER HAVING CATAPHORESIS MEANS

[75] Inventors: Shing Chung Wang, Temple City; Randolph W. Hamerdinger, Glendora; William F. Hug, Pasadena, all of Calif.

[73] Assignee: Xerox Corporation, Stamford, Conn.

[21] Appl. No.: 701,476

[22] Filed: July 1, 1976

[51] Int. Cl.² ............................................. H01S 3/22
[52] U.S. Cl. ............................ 331/94.5 G; 331/94.5 T
[58] Field of Search .................. 331/94.5 D, 94.5 G, 331/94.5 PE, 94.5 T; 330/4.3

[56] References Cited

U.S. PATENT DOCUMENTS 3,639,804   2/1972   Hernquist ....................... 331/94.5 G

*Primary Examiner*—William L. Sikes
*Attorney, Agent, or Firm*—James J. Ralabate; Franklyn C. Weiss; Anthony W. Karambelas

[57] ABSTRACT

A radiation emission device characterized by a cylindrical cathode enclosed by an elongated envelope having a body section and two end sections is disclosed. The device includes an anode terminal, coupled to the body section, which serves to provide electrical energy to excite metallic material inside the envelope. The device further includes a pair of cataphoresis terminals located along each end section to prevent the excited metallic material from drifting into contact with radiation transmission windows located at the terminus of each end section.

1 Claim, 3 Drawing Figures

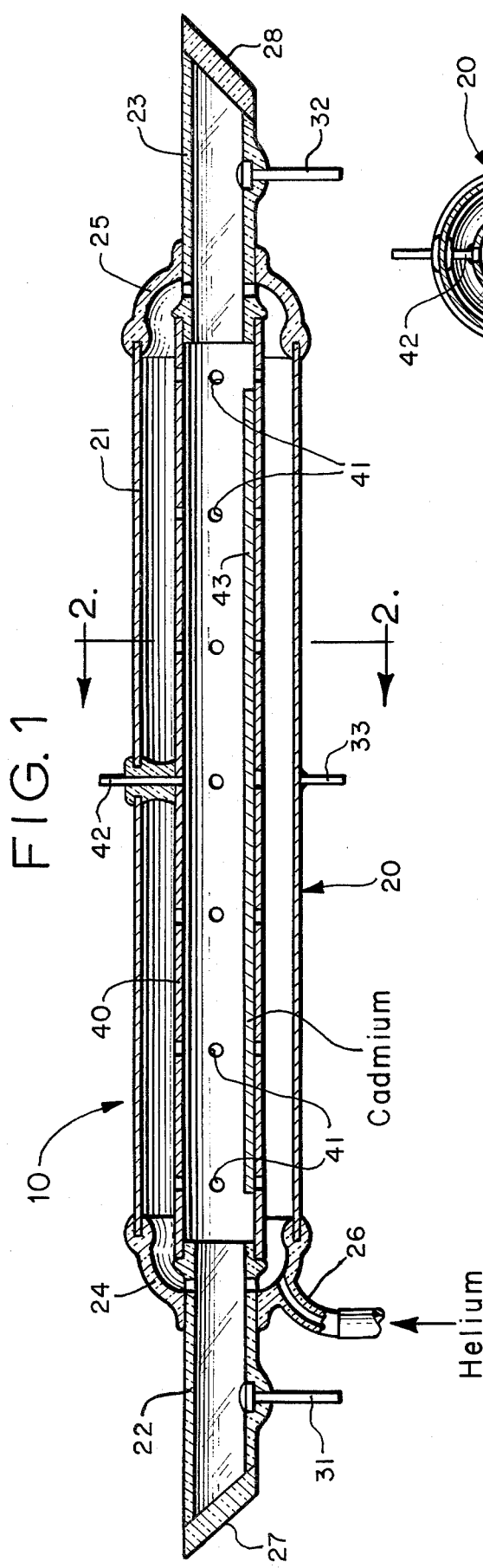
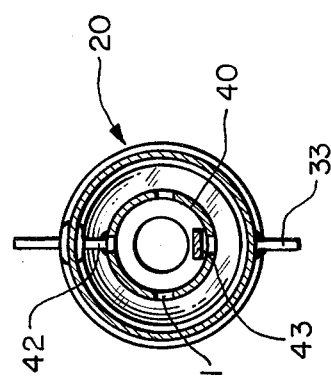
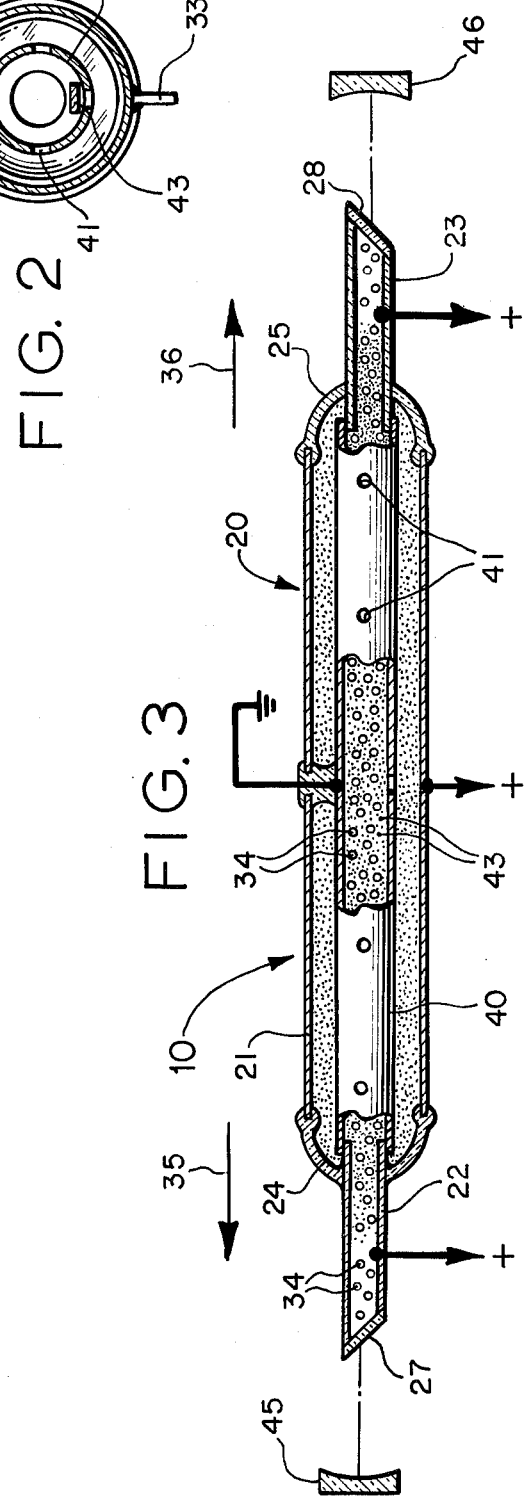

METAL VAPOR LASER HAVING CATAPHORESIS MEANS

BACKGROUND OF THE INVENTION

This invention relates to radiation emission devices in general, and in particular to radiation emission devices of the type which are frequently referred to as lasers. Lasers are generally characterized by an elongated envelope containing a material which can be raised from an initial energy state to a so-called excited energy state. The particular means used to excite the material in the envelope may vary. Thus, depending on the type of laser used, optical, electrical or chemical excitation means may be employed.

After excitation, radiation may be emitted spontaneously as the excited material returns to a more stable energy level, and/or through stimulated emission. In either case, the wavelength of the radiation so emitted is proportional to the energy difference between the energy levels of the transition involved. This, in turn, depends upon the inherent characteristics of the material itself.

The radiation, which propagates at a constant wavelength, generally leaves the envelope via radiation transmission means disposed at both ends thereof. The radiation transmission means are typically translucent windows which are often, but not necessarily, inclined at an angle which optimizes a particular polarization of light. This inclination is usually referred to as Brewster's angle, and the windows so inclined are often characterized as Brewster's windows.

Lasers of the type described typically include reflection means such as concave mirrors located a predetermined distance beyond each translucent window. The mirrors are aligned such that the radiation emitted from a translucent window is reflected back into the envelope to stimulate the emission of a substantially increased amount of radiation which then passes through the opposite window. This increased radiation is likewise reflected back into the envelope by the other mirror, thereby increasing the emitted radiation even more. As the radiation is continuously reflected back and forth through the envelope, greater and greater amounts of radiation are produced. It is in this manner that the energy of stimulated emission of radiation is "amplified" by the laser device. Of course, in order to enable the amplified radiation to escape therefrom, at least one of the mirrors are generally made only partially reflective.

Many different materials may be used to effect radiation emission, including certain members of the class of materials known as metals. Because the metals used in this type of laser must generally be transformed from a normally solid or liquid state, to a gaseous state in order to effect excitation, such lasers are frequently referred to as metal vapor lasers. It is thus clear that in metal vapor lasers, excitation means must be provided which first vaporize the metal and then raise the vaporized metal from an initial energy state to an excited energy state.

Though metal vapor lasers of the type described have been used to emit radiation, it is well known that they can be subject to certain drawbacks. In particular, the vaporized metal tends to condense on the translucent windows located at the ends of the elongated envelope, thereby rendering the windows relatively opaque, and hence less capable of transmitting radiation. In the past, attempts to remedy this problem have included the use of cataphoretic means for establishing an electric field within the laser envelope. The electric field is typically arranged to accelerate the vaporized metal ion away from the region nearest the translucent windows, thereby confining the vaporized metal to the more central portions of the envelope.

Metal vapor lasers have heretofore required relatively complicated, cumbersome, and inefficient apparatus to accomplish both excitation and confinement of the metal. It is therefore an object of this invention to provide an improved laser configuration which achieves these results more economically and more effectively. It is another object of this invention to provide an improved metal vapor laser characterized by increased laser life and better performance. Other objects, features and advantages of the invention, as summarized below, will be apparent upon reading the following detailed description in conjunction with the accompanying drawings.

SUMMARY OF THE INVENTION

In accordance with the foregoing objects, this invention pertains to a device for promoting the emission of radiation. The device comprises a cathode substantially surrounded by an envelope having a body section and a pair of end sections, each of the end sections terminating in a radiation transmission member. The device further includes an anode terminal, coupled to the body section for passing electrical energy to the device for heating the cathode and causing metallic material inside the envelope to vaporize. The application of electrical energy to the anode terminal further causes gaseous material inside the envelope to interact with the metallic material to raise the metallic material from an initial state to a vaporized excited state characterized by a positive electronic charge.

The device also includes a cathode terminal, coupled to the cathode, to provide an electrical return path from the cathode to a point of low potential, and a pair of cataphoresis terminals. One of the cataphoresis terminals is disposed along one of the end sections in advance of one of the radiation transmission members, and the other cataphoresis terminal is similarly disposed with respect to the other end section. The cataphoresis terminals are adapted to receive electrical energy, and upon receipt thereof serve to establish an electrical field within the envelope for urging the ionized metallic vapor away from the nearest of the radiation transmission members, thereby minimizing the condensation of the vaporized metallic material on the radiation transmission members.

DESCRIPTION OF THE DRAWINGS

FIG. 1 is a schematic view of an exemplary embodiment of the invention.

FIG. 2 is a sectional view taken across lines 2—2 of FIG. 1.

FIG. 3 is a slightly reduced, partially cutaway schmatic view of the embodiment illustrated in FIG. 1, further illustrating the embodiment in operation.

DETAILED DESCRIPTION OF AN EXEMPLARY EMBODIMENT

Referring now to the figures, a device for stimulating the emission of radiation is shown in the form of a laser 10. Laser 10 is comprised of an elongated envelope 20, having a body section 21 preferably fabricated from electrically conductive material, and a pair of end sections 22, 23 which may be fabricated from glass or ceramic. End sections 22, 23 are attached to body section 21 by any appropriate means such as corresponding glass or ceramic-to-metal seals 24, 25. As shown in FIG. 1, envelope 20 initially includes a passage 26 for inserting gaseous material therein, though upon insertion, the envelope is ordinarily hermetically sealed.

Each of end sections 22, 23 terminates in radiation transmission means which are referred to hereinafter as windows 27, 28. If it is desired to optimize a particular polarization of light, windows 27, 28 may be inclined at Brewster's angle. As explained hereinafter, radiation produced by laser 10 is adapted to pass axially through windows 27, 28.

Located along each end section 22, 23, in advance of respective windows 27, 28 is a pair of cataphoresis terminals 31, 32. Cataphoresis terminals 31, 32 extend through envelope 20 and, as shown in FIG. 3, are connected to a source of electrical energy, which in this case, is a positive voltage supply. As explained in greater detail hereinafter, cataphoresis terminals 31, 32 serve to establish an electric field inside envelope 20 to accelerate excited vaporized material away from the nearest one of windows 27, 28, thereby preventing such material from contacting the windows and condensing thereon. Laser 10 also includes an anode terminal 33 preferably coupled between a positive voltage supply and body section 21 to supply electrical energy thereto.

Disposed inside envelope 20 is a hollow, substantially cylindrical member fabricated from electrically conductive material which serves as a cathode 40. Cathode 40 preferably extends coaxially with envelope 20, particularly body section 21 thereof. To facilitate the distribution of electrical discharge and gaseous material inside envelope 20, cathode 40 preferably includes a plurality of perforations 31 disposed in its cylindrical surface. Preferably, but not necessarily, located midway between the ends of cathode 40 is a cathode terminal 42 which extends through glass envelope 20 where it can be connected to a point of low potential such as ground as shown in FIG. 3.

In operation, a preselected laser material which can be excited from an initial energy state to an excited energy state for the purpose of effecting the emission of radiation, and a preselected host gas, are inserted within the confines of envelope 20. The particular types and quantities of such material may vary, though in this exemplary embodiment, about 1–2 grams of cadmium metal are placed inside cathode 40 and are used for laser medium, while gaseous helium at a pressure of approximately 4–10 torrs is initially inserted within envelope 20 via passage 26, and serves as the host gas. The cadmium which, as shown in FIG. 1, is intially in solid form, is identified herein by reference numeral 43, and the helium inserted within envelope 20, is represented herein by reference numeral 34.

When a positive voltage is applied to anode terminal 33, some of the helium atoms 34 become ionized while others are raised to certain excited states. The ionized helium and electrons define a conductive path between anode terminal 33 and cathode 40 via the perforated hole in the cathode 40. As a result, cathode 40 is heated to a relatively high temperature, thereby causing the cadmium placed therein to vaporize.

The vaporized cadmium atoms invariably collide or interact with the helium ions and/or excited state helium to create an energy exchange therebetween. This energy exchange raises the cadmium atoms from their initial energy state to an ionized excited energy state, characterized by a positive electronic charge. Simultaneously, the excited and/or ionized helium returns to its initial state. However, the continuous application of a positive voltage at anode terminal 33 creates a constant supply of ionized and excited helium within envelope 20 to promote further energy exchanges with the vaporized cadmium atoms.

The excited cadmium may return to the lower energy states through spontaneous and/or stimulated emission. In the process of returning to its lower energy states, radiation is emitted at a frequency which is dependent upon the internal properties of the excited material. Thus, for cadmium a characteristic red, green and blue light are emitted through windows 27, 28.

Disposed beyond each of windows 27, 28 is a concave mirror 45, 46 shown in FIG. 3. In a manner well known in the art, mirrors 45, 46 reflect the radiation emitted through windows 27, 28 into envelope 20 to stimulate the emission of increased amounts of radiation. These increased amounts of radiation also pass through windows 27, 28 until they are again reflected back inside envelope 20 by mirrors 45, 46. Thus, as explained above, the stimulated emission of radiation is "amplified" many times by laser 10. Of course, to allow the "amplified" energy to escape from the device, at least one of mirrors 45, 46 are made only partially reflective.

As explained above, a positive voltage is also applied to cataphoresis terminals 31, 32. This positive voltage creates, within envelope 20, electric field gradients identified by reference numerals 35, 36 in FIG. 3. Electric field gradients 35, 36 are directed from cathode 40 toward anodes 31, 32, respectively. Consequently, the areas immediately in advance of windows 27, 28 are more positive than the more central areas of envelope 20. Thus, the cataphoretic effect tends to accelerate the positively charges, excited cadmium vapor away from the nearest of windows 27, 28 and toward cathode 40. As a result, the excited cadmium will generally be prevented from drifting too close to windows 27, 28 to condense thereon. Thus, all of the adverse effects that typically result from the condensation of vaporized metal onto windows 27, 28 are mitigated, if not completely eliminated.

In view of the foregoing, it should be apparent that the configuration of laser 10 described above includes means which effectively cause the laser material to be excited from an initial energy state to an excited state, and means which substantially prevent the excited laser material from drifting toward and condensing on windows 27, 28. This is achieved, in part, by providing one pair of cataphoresis terminals 31, 32 in advance of windows 27, 28, a more centrally located anode terminal 33, and cathode terminal 41. As a result, the effects of excitation and cataphoresis can be achieved in an economical and efficient laser device.

Though the exemplary embodiment of the invention herein disclosed is preferred, it will be clear to those skilled in the art that numerous modifications and refinements can be made without departing from the true scope of the invention. Accordingly, all such modifications and refinements are intended to be covered by the appended claims.

We claim:

1. A device for stimulating the emission of radiation by the excitation of metallic material from an initial state to an excited state comprising:

a hollow, substantially cylindrical, electrically conductive member arranged to be employed as a cathode;

an envelope, substantially surrounding said cathode and being disposed substantially coaxially therewith, having a substantially cylindrical, electrically conductive body section, and a pair of substantially nonconductive end sections extending, respectively, from each end of said body section, each of said end sections terminating in a radiation transmission member; said envelope being adapted to substantially enclose a quantity of gaseous material and a quantity of unvaporized metallic material;

an anode terminal, coupled to said body section, for passing electrical energy to said device for heating said cathode and causing said metallic material to vaporize, and for further causing said gaseous material and said metallic material to interact to raise said metallic material from an initial state to a vaporized excited state characterized by a positive electric charge;

a cathode terminal, coupled to said cathode, for providing an electrical return path from said cathode to a point of low potential; and a pair of cataphoresis terminals, one of said cataphoresis terminals being disposed along one of said end sections in advance of one of said radiation transmission members, and the other of said cataphoresis terminals being disposed along the other of said end sections in advance of the other one of said radiation transmission members; said pair of cataphoresis terminals being further adapted to establish an electrical field within said envelope for urging said vaporized metallic material away from the nearest of said radiation transmission members, thereby minimizing the condensation of said vaporized metallic material on said radiation transmission members.

* * * * *